United States Patent [19]

Schmitt et al.

[11] 4,161,976
[45] Jul. 24, 1979

[54] ANTI SKID CHAIN

[75] Inventors: Wilhelm Schmitt, Heppenheim-Erbach; Herbert Schumacher, Gorxheimertal, both of Fed. Rep. of Germany

[73] Assignee: Firma Carl Freudenberg, Weinheim, Fed. Rep. of Germany

[21] Appl. No.: 803,925

[22] Filed: Jun. 6, 1977

[30] Foreign Application Priority Data

Jul. 10, 1976 [DE] Fed. Rep. of Germany ....... 2631147

[51] Int. Cl.$^2$ ............................................. B60C 27/06
[52] U.S. Cl. ..................................... 152/239; 152/243
[58] Field of Search ............... 152/208, 239, 231, 241, 152/221, 243, 210

[56] References Cited

U.S. PATENT DOCUMENTS

| | | | |
|---|---|---|---|
| 1,929,238 | 10/1933 | Corey | 152/243 |
| 1,981,394 | 11/1934 | Smith | 152/243 |
| 3,768,534 | 10/1973 | Gower | 152/239 |
| 3,934,633 | 1/1976 | Bula | 152/221 |

FOREIGN PATENT DOCUMENTS

| | | | |
|---|---|---|---|
| 1480879 | 4/1964 | Fed. Rep. of Germany | 152/239 |
| 2355291 | 6/1973 | Fed. Rep. of Germany | 152/208 |
| 399213 | 4/1963 | Switzerland | 152/231 |

*Primary Examiner*—L. J. Paperner
*Assistant Examiner*—Lawrence E. Williams
*Attorney, Agent, or Firm*—Sprung, Felfe, Horn, Lynch & Kramer

[57] ABSTRACT

Anti-skid tire chain comprises a network positionable during use in the region of the tire tread. The network includes two parallel chains extendable along opposite sides of the tread, a plurality of rings interconnected into each chain for guiding same and a plurality of straps. Each strap interconnects one ring from one chain with one ring from the other chain and each crosses over another strap. At least one post is connected to a strap in the region of each intersection and is composed of synthetic material.

12 Claims, 3 Drawing Figures

ANTI SKID CHAIN

BACKGROUND OF THE INVENTION

This invention relates to an antiskid tire chain with a network arranged in the region of the tread, which network is suspended on rings arranged at the side, the rings serving in a per se known manner for guiding the tension chains.

Antiskid chains serve for improving the force of traction of wheeled vehicles. They frequently consist of hardened steel members of variable design and are occasionally also called snow chains. Their use has hitherto been possible only on a soft substratum. If they remain on the vehicle while traveling over a hard substratum, for example or snowfree asphalt roads, considerable risks and disadvantages are directly entailed.

In this connection there are to be mentioned, first of all, important encroachments on driving safety which become perceptible particularly in the form of considerably increased stopping distances and reduces steering control. Heavy wear phenomena occur and after only 50 to 100 km, depending upon driving speed, and there may be breakage of the chain with considerable resultant damage. Along with this, riding comfort is also adversely affected, specifically, particularly as a result of the unbalanced increased wheel vibration and the noise of the rolling chain. Rather recently there has become known a snow chain of synthetic material with a reticular structure, which chain, designed to be endless and slipped onto the wheel in the axial direction, is tightened by the use of centering elements. The use of such a snow chain, however, also entails various disadvantages have appeared in addition to an unsatisfactory general instability, in particular, considerable difficulties in mounting under difficult conditions, for example on a vehicle that is already stuck.

SUMMARY OF THE INVENTION

The object of this invention is to provide an antiskid chain which overcomes the above difficulties and disadvantages and which combines, to a particularly high degree, driving safety and riding comfort under variable road conditions.

This object is accomplished pursuant to the invention by an antiskid tire chain comprising a network arranged in the region of the tread, which network is suspended on rings arranged at the side, the rings serving in a per se known manner for guiding the tension chains, and wherein the rings are interconnected by straps crossing over each other in the region of the tread, which straps in the region of the intersection have one or a plurality of posts of synthetic material, fastened detachably or undetachably. In one particular embodiment it is provided that the straps comprise a fabric of synthetic fibers, preferably of a fabric of polypropylene fibers. The post or posts advanteously comprise a polyurethane, in which, if necessary, may be embedded a metallic or mineral granulate. The shape of the posts is preferably circular, while they may have a cross-section widening along the surface of the tire. In this connection, a further advantageous embodiment alternatively provides that the post or posts may have one or a plurality of recesses for the insertion of secondary antiskid means such as special recesses for the insertion of spikes. According to a particularly advantageous mode of construction it is provided that the straps, in the region of the intersection from time to time have five posts in a symmetrical arrangement, which are connected undetachably with the straps.

BRIEF DESCRIPTION OF THE DRAWING

The accompanying drawing shows one mode of construction, by way of example, of the antiskid chain pursuant to the invention, in which.

DETAILED DESCRIPTION OF THE INVENTION

Figure 1:
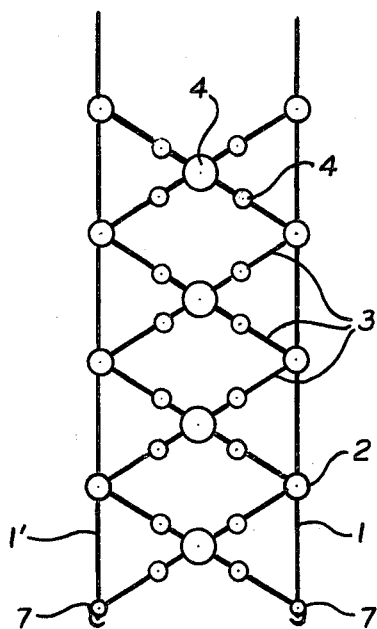
FIG. 1 is a schematic view of the construction of the snow chain pursuant to the invention in unrolled form.

FIG. 1 shows one embodiment of the antiskid chain pursuant to the invention. This embodiment utilizing connecting elements such as hooks 7 is greatly preferable if mounting under difficult conditions is to be assumed. If, on the contrary, this requirement is not to be anticipated, then the cheaper construction of an endless chain is abundantly sufficient. The basic structure, however, is similar in the two embodiments.

The antiskid chain pursuant to the invention consists of a network arranged in the region of the tread, including straps 3, which cross over each other and which are suspended on rings 2 arranged along the sides. The rings, at the same time, serve for guiding of the tension chains 1 and 1' arranged at opposite sides on the thread. At least one post 4, composed of synthetic material, is arranged either detachably or undetachably on the straps 3 in the region of their intersection.

In principle there exists, to be sure, the possibility of from time to time making one of the crosses suspended between four rings homogeneous of a specific synthetic material and anchoring it. This solution, however, has proven unsatisfactory, in particular because the posts are subject to stresses of a totally different kind than are the carrying straps. While the latter must in particular have considerable tensile strength with as little elongation as possible, regardless of the prevailing outside temperature and of the effect of water and chemicals, the posts themselves are subject to considerable abrasive stress.

The straps 3 of the nonskid chain pursuant to the invention are made preferably of a fabric of synthetic fibers, polypropylene fiber straps in particular having been found to be especially suitable. The posts are made preferably of polyurethane materials of fairly high hardness, wherein molding or injection processes or injection molding processes may be used. Their geometric design, their dimensions and their specific arrangement are thereby obtained in particular from the respective dimensions of the pertinent tire.

Figure 2:
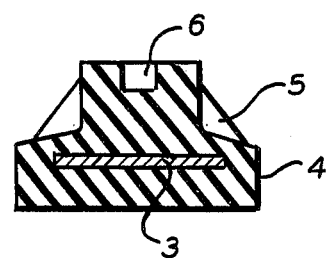
FIG. 2 is a sectional view of a post of FIG. 1.
Figure 3:
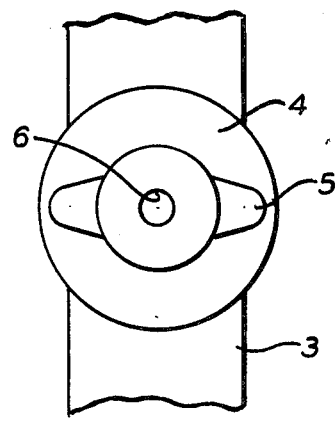
FIG. 3 is a top view of the post of FIG. 2.

A mode of construction of the posts 4 which has proven particularly successful is that shown in FIGS. 2 and 3. Herein is shown a post with a T-shaped section with a circular area, the greatest diameter of which corresponds to about one and one-half to two times its total height, so that overturning in case of sudden lateral impact stresses is reliably avoided. The posts may be reinforced by lateral ribs 5 arranged in the direction of travel, but it is likewise easily possible to give the entire post a cylindrical or a conical section.

The antiskid chain pursuant to the invention has a particularly high degree of automatic cleaning, and in spite of a quiet rolling action of the wheel, already setting in at relatively low speeds, a particularly high degree of steering control is assured. Along with this, additional improvement in the good gripping quality of the antiskid chain pursuant to the invention may be achieved by the embedding of metallic or mineral granulate in the posts, for example by the embedding of a coarse-grained abrasive. In particular, for use predominantly on icy roads it may, in contrast, in certain cases be preferable to arrange metal pins or spikes in the posts in special recesses 6.

An outstanding advantage of the antiskid chain pursuant to the invention is in additional derived from the great range of tension, contingent on the design, which makes it possible to mount the chain alternatively on variable wheel diameters.

It will be appreciated that the instant specification and claims are set forth by way of illustration and not limitation, and that various modifications and changes may be made without departing from the spirit and scope of the present invention.

What is claimed is:

1. An antiskid tire chain comprising a network positionable during use in the region of the tire tread, including two parallel chains extendable along opposite sides of the tread, a plurality of rings interconnected into each chain for guiding same, a plurality of straps each interconnecting one ring from one chain with one ring from the other chain and each crossing over another strap, and at least one post connected to a strap in the region of each intersection, each post being composed of synthetic material and comprising a circular member having a T-shaped cross-section having the larger diameter portion comprising a planar surface contacting the surface of the tire during use and wherein the straps pass through the larger diameter portion entering and leaving same spaced from said planar surface.

2. The antiskid tire chain according to claim 1, wherein the straps comprise a fabric of synthetic fibers.

3. The antiskid tire chain according to claim 2, wherein the fabric is a fabric of polypropylene fibers.

4. The antiskid tire chain according to claim 1, wherein each post comprises a polyurethane.

5. The antiskid tire chain of claim 4, where the polyurethane is one of a metallic and mineral granulate embedded therein.

6. The antiskid tire chain according to claim 1, wherein each post has at least one recess in the smaller diameter portion for the insertion of secondary antiskid means.

7. The antiskid tire chain according to claim 6, wherein the secondary antiskid means comprises spikes.

8. The antiskid tire chain according to claim 1, wherein the posts include means for detachably connecting same to the straps.

9. The antiskid tire chain according to claim 1, wherein each intersection has said one post receptive of two intersecting straps and four posts distributed symmetrically around said one post and receptive of one strap of the two intersecting straps therethrough and wherein the posts are fixedly connected to their straps.

10. The antiskid tire chain according to claim 1, further comprising strengthening ribs between the smaller diameter portion and the larger diameter portion.

11. The antiskid tire chain according to claim 1, wherein each post has its greatest width about 1½ to 2 times its height.

12. The antiskid tire chain according to claim 1, further comprising strengthening ribs between the smaller diameter portion and the larger diameter portion.

* * * * *